United States Patent Office 3,332,930
Patented July 25, 1967

3,332,930
BASIC DIALKYL BENZIMIDAZOLIUM AZO
DYESTUFFS
Reinhard Mohr, Offenbach am Main, and Rolf Bender, Obertshausen, near Offenbach, Germany, assignors to Farbwerke Hoechst Aktiengesellschaft vormals Meister Lucius & Bruning, Frankfurt am Main, Germany, a corporation of Germany
No Drawing. Filed Dec. 14, 1964, Ser. No. 418,264
Claims priority, application Germany, Dec. 14, 1963, F 41,548; Oct. 23, 1964, F 44,292, F 44,293
7 Claims. (Cl. 260—146)

The present invention provides new basic azo dyestuffs and processes for preparing them; more particularly, the present invention provides basic azo-dyestuffs which are free from sulfonic acid and carboxylic acid groups and the cation of which corresponds to the general formula

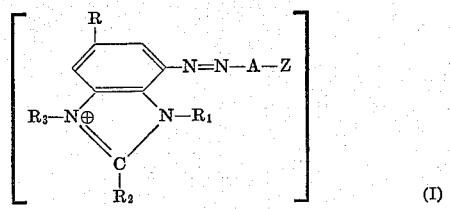

(I)

in which R represents a halogen atom, an alkyl or alkoxy group, $R_1$ represents an alkyl group, $R_2$ represents a hydrogen atom, an alkyl, aralkyl or aryl group, $R_3$ represents an alkyl or aralkyl group, A represents an aromatic or heterocyclic radical and Z represents a hydroxy group, a primary, secondary or tertiary amino group. Illustrative of these definitions are wherein R represents a chlorine atom or a methyl group, $R_1$ and $R_3$ each represent a lower alkyl group, $R_2$ represents a hydrogen atom or a lower alkyl group, A represents a benzene radical, a benzene radical substituted by chlorine, a lower alkyl, lower alkoxy, amino or hydroxy, a naphthalene radical, a quinoline radical or a pyrazole radical, Z stands for a hydroxy, amino, lower alkylamino, lower fluoralkylamino, lower hydroxyalkylamino, lower cyanalkylamino, lower alkoxy-lower alkylamino, phenoxy-lower alkylamino, phenylamino, di-(lower alkyl)-amino, di-(lower hydroxyalkyl)-amino, di-(lower fluoralkyl)-amino, di-(lower cyanoalkyl)-amino, di-(lower alkoxy-lower alkyl)-amino, di-(phenoxy-lower alkyl)-amino, di-(phenyl-lower alkyl)-amino, lower alkyl-lower fluoralkylamino, lower alkyl-lower hydroxyalkylamino, lower alkyl-lower cyanoalkylamino, lower alkyl-lower alkoxyalkylamino, lower alkyl phenoxy-lower alkylamino, lower alkyl-phenyl lower alkylamino, lower alkyl phenylamino, piperidino, morpholino or piperazino group and X⁻ stands for an anion of hydrochloric, hydrobromic or hydroiodic acid, sulfuric acid, a lower monoalkyl ester of sulfuric acid, benzene sulfonic acid, p-toluene sulfonic acid, or a zinc chloride or cadmium chloride complex compound.

The above-specified dyestuffs can be obtained by:
(a) Coupling the diazonium compound of a quaternary amine of the general formula

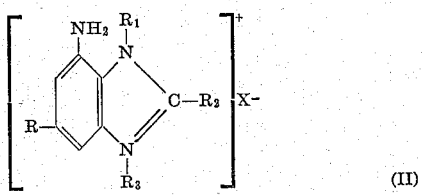

(II)

in which R, $R_1$, $R_2$, and $R_3$ have the meanings given above and X⁻ represents an anion, with a coupling component of the formula

A—Z     (III)

in which A and Z have the meanings given above, or by
(b) Treating with quaternizing agents an azo dyestuff of the general formula

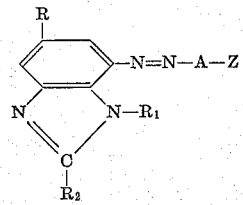

(IV)

in which R, $R_1$, $R_2$, A and Z have the meanings given above.

The quaternary amines used for the method of operation described under (a) (thus, the quaternary amines which correspond to the Formula II) can be obtained by the treatment with quaternizing agents of amines of the formula

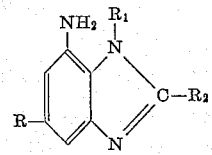

(V)

suitably in the presence of organic solvents. The said quaternizing agents may be alkyl or aryl esters of sulfuric acid or of organic sulfonic acids, or alkyl or aralkyl halides of sulfuric acid or of organic sulfonic acids.

As coupling components of the Formula III, there may be used in the process of the present invention aromatic or heterocyclic compounds which are free from sulfonic acid and carboxylic acid groups and which couple in o- or p-position to a hydroxy group or to a primary, secondary or tertiary amino group. From the series of coupling components which couple in o- or p-position to a hydroxy group and which, therefore, are suitable for the above purpose, there may be mentioned aromatic or heterocyclic hydroxy compounds or compounds which contain an enolizable or enolized keto-methylene group situated in a heterocyclic ring. Such compounds are, for example, phenol, phenol derivatives which are substituted in 4-position such as p-cresol, p-chlorophenol, 4-hydroxy-1,2-xylene, 4-hydroxyacetophenone and hydroquinone monomethyl ether, α-naphthol derivatives substituted in 4-position, such as 4-chloro-1-naphthol, 4-methoxy-1-naphthol and 4-benzoyl-1-naphthol, β-naphthol and its derivatives such as 6-bromo-2-naphthol, 7-hydroxy-2-methoxynaphthalene, 1-benzoylamino-7-naphthol and 4-phenylazo-1-amino-7-naphthol, and 6-hydroxyquinoline, 8-hydroxyquinoline, 3-hydroxydiphenylamine, 2-hydroxycarbazole, 3-hydroxydiphenylene oxide and 1-aryl-3-methyl-5-pyrazolone. In addition to these monohydroxy compounds, there may likewise be used as coupling components polyhydroxy compounds of the aromatic or heterocyclic series which couple in o-position to the hydroxy groups, for example, resorcinol, benzoylresorcinol, terephthaloyl-bis-resorcinol, 2,6-dihydroxynaphthalene, 2,4-dihydroxyquinoline and 3,6-dihydroxydiphenylene oxide. Suitable are furthermore, alkyl or aryl amides of aromatic or heterocyclic o-hydroxycarboxylic acids or of acylacetic acids, for example, aryl- or alkyl amides of 2,3-hydroxynaphthoic acids, 2-hydroxycarbazole-3-carboxylic acids, 3-hydroxydiphenylene oxide-2-carboxylic acids, of the acetoacetic acid or of the benzoylacetic acid.

From the coupling components which couple in o- or p-position to a primary, secondary or tertiary amino group and which are thus suitable for the process of the present invention, there may be mentioned aromatic or heterocyclic amino compounds. As primary amines, there may be used, for example, aniline, toluidine, xylidine, anisidine, phenylenediamines, tolylenediamines, aminocresol ethers, alkoxyanilines, chloranilines, 3-acylaminoanilines, dialkoxyanilines, naphthylamines and heterocyclic amines such, for example, as 5-aminopyrazoles, 7-aminoindazoles or 8-aminoquinolines. As secondary or tertiary amines, there are suitable compounds the radical A of which belongs to the benzene or naphthalene series and which may carry as further substituents, for example, halogen atoms, alkyl, alkoxy, carbalkoxy, alkylsulfonyl or acylamino groups. For the secondary or tertiary amino group Z, there may be mentioned as substituents, for example, lower molecular weight alkyl radicals such as methyl, ethyl, propyl or butyl radicals, or aralkyl, cycloalkyl or aryl radicals, which may carry, if desired, other substituents such as fluorine atoms, hydroxy, cyano, phenyl, alkoxy or phenoxy groups. In the tertiary amines, the alkyl groups may form, either with one another or together with a nitrogen or oxygen atom, hydrogenated hetero rings such as the piperidine, morpholine or piperazine ring.

Furthermore, there may also be used as coupling components compounds which contain a hydroxy group and an amino group, for example, aminophenols or aminonaphthols.

The diazotization of the quaternary amines of the Formula II is carried out according to known methods, for example, by means of hydrochloric acid and sodium nitrite. Coupling is also carried in known manner, for example, in a neutral or acid medium, if desired or required in the presence of buffer substances or of compounds which accelerate coupling, for example pyridine.

The azo dyestuffs of the Formula IV used in the method of operation described under (b) can be obtained in known manner by coupling the diazotized amines of the Formula V with the coupling components of the Formula II. They are treated with quaternizing agents such as alkyl or aralkyl halides, alkyl esters of the sulfuric acid or alkyl or aryl esters of organic sulfonic acids. Suitable quaternizing agents are, for example, methyl chloride, methyl bromide or methyl iodide, ethyl bromide or ethyl iodide, propyl bromide or propyl iodide, benzyl chloride or benzyl bromide, dimethyl sulfate, diethyl sulfate, benzenesulfonic acid methyl ester, p-toluenesulfonic acid methyl, propyl or butyl ester. The quaternization is suitably carried out in an inert organic solvent, for example, in a hydrocarbon, chlorohydrocarbon or nitrohydrocarbon, for example, benzene, toluene, xylene, chlorobenzene or nitrobenzene, in an acid amide or acid anhydride such as dimethylformamide or acetic acid anhydride, in dimethyl sulfoxide or in a ketone such as methylethyl-ketone. Instead of an organic solvent, there may also be used an excess of the quaternizing agent. Quaternization is carried out at elevated temperature, if desired or required under pressure. The conditions which are most favorable for each individual case can be easily determined by a preliminary test.

As the anion $X^-$, the dyestuffs obtained according to the present invention preferably contain the radical of a strong acid, for example, that of sulfuric acid or of the monoesters thereof, of an arylsulfonic acid or of a hydrohalic acid. These anions, introduced according to the process of the invention, may also be replaced by anions of other acids, for example, of phosphoric acid, acetic acid, oxalic acid, lactic acid or tartaric acid. Furthermore, the dyestuffs may also be isolated in form of their complex salts with zinc or cadmium halides.

The novel dyestuffs are suitable for the dyeing or printing of tanned cellulose fibers, silk, leather or synthetic fibers such as acetate rayon or polyamide fibers, in particular, however, fibers of polyacrylonitrile or polyvinylene cyanide. The dyeings produced with these dyestuffs on polyacrylonitrile fibers are distinguished by very good fastness to light and to wetting. Wool is resisted by the dyestuffs of the present invention.

The following examples illustrate the invention, but they are not intended to limit it thereto:

*Example 1*

30.8 g. of 5-chloro-7-amino-1,3-dimethyl-benzimidazolium-methyl sulfate are dissolved in 200 cc. of water and 70 cc. of 5N-hydrochloric acid and diazotized at 15° C. with 20 cc. of a 5N-sodium nitrite solution. The diazo solution is introduced into a well stirred suspension of 16.3 g. of 3-methyl-N,N-diethylaniline in 200 cc. of water. Coupling begins immediately and there is obtained a dark blue red solution of the dyestuff. When coupling is completed, such a quantity of a 70% zinc chloride solution is added that the zinc chloride complex salt of the dyestuff cation of the formula

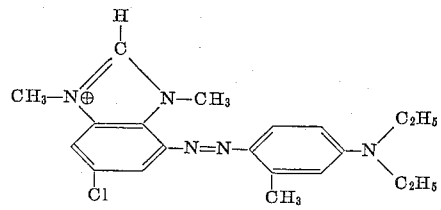

is precipitated quantitatively. The dyestuff is filtered off with suction, washed with a small amount of ice-cold water and dried at 60° C. A dark powder having metallic luster is obtained which dissolves readily in hot water to give a blue red solution.

The same dyestuff is obtained by quaternizing the azo dyestuff, prepared in the usual manner from 18.2 g. of diazotized 5-chloro-7-amino-1-methylbenzimidazole and 16.3 g. of 3-methyl-N,N-diethylaniline, at 100° C., in an excess of dimethyl sulfate. The methyl sulfate of the dyestuff cation of the above formula is precipitated by means of ether, washed twice with 50 cc. of ether, the viscous greasy paste obtained is dissolved in 200 cc. of water, and a small quantity of insoluble residue is filtered off. The zinc chloride complex compound of the above dyestuff cation is precipitated by the addition of excess zinc chloride solution, filtered off, washed with water and dried at 60° C.

The dyestuff obtained by the above two methods of operation dyes polyacrylonitrile fibers from an acetic bath deep bluish red shades having very good fastness to light, to washing to rubbing, to ironing and to perspiration.

*Example 2*

36.9 g. of the zinc chloride complex salt of 5-chloro-7-amino-1,3-dimethylbenzimidazolium chloride of the formula

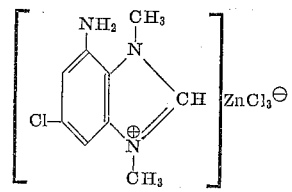

are dissolved in 500 cc. of water and 70 cc. of 5N-hydrochloric acid and diazotized at 15° C. with 20 cc. of 5N-sodium nitrite solution. 18.4 g. of 3-chloro-N,N-diethylaniline are then introduced dropwise into the clear, yellow-brown diazo solution. When coupling is completed, the zinc chloride complex salt of the dyestuff cation of the formula

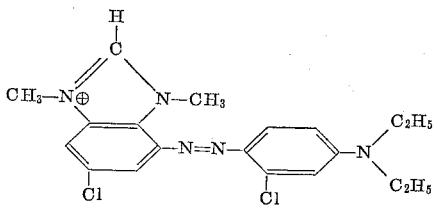

which has separated in crystalline form is filtered off with suction, washed with a small amount of water and dried at 60° C.

The dyestuff thus obtained which has a green metallic luster dissolves in warm water to give a red solution and dyes polyacrylonitrile fibers from a weakly acetic bath deep yellowish red shades that have very good fastness to light, to washing, to rubbing and to ironing.

*Example 3*

35 g. of 5-chloro-7-amino-1,3-diethylbenzimidazolium ethylsulfate of the formula

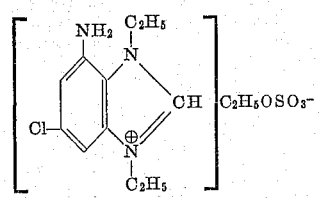

are dissolved in 300 cc. of water and 50 cc. of 5N-hydrochloric acid and diazotized at 15° C. with 20 cc. of a 5N-sodium nitrite solution, 20 cc. of a 70% zinc chloride solution are added to the clear yellow brown diazo solution and then 19.5 g. of 3-methyl-N,N-di-β-hydroxyethylaniline, dissolved in 100 cc. of water and 20 cc. of 5N-hydrochloric acid, are added. As soon as coupling is completed, the zinc chloride compound of the dyestuff cation of the formula

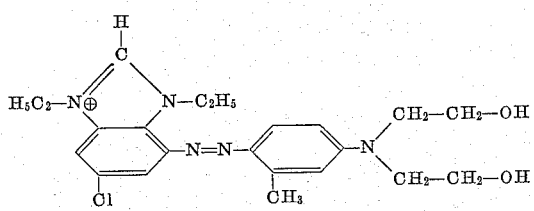

separates in the form of red crystals. The compound is filtered off with suction, washed with a small amount of cold water and dried.

There are obtained crystals having metallic luster which dissolve readily in warm water to give a red solution. The dyestuff dyes polyacrylonitrile fibers from acetic baths deep red shades having very good fastness to light, to washing, to rubbing, to ironing and to perspiration.

*Example 4*

18.2 g. of 5-chloro-7-amino-1-methylbenzimidazole are diazotized at 5° C. in 300 cc. of water and 80 cc. of 5N-hydrochloric acid with 20.5 cc. of a 5N-sodium nitrite solution. The yellowish diazo solution is then introduced into a soluiton of 14.4 g. of 2-hydroxynaphthalene in 100 cc. of water and 80 cc. of a 5N-sodium hydroxide solution. When coupling is terminated, the coupling mixture is neutralized by means of glacial acetic acid, the insoluble dyestuff of the formula

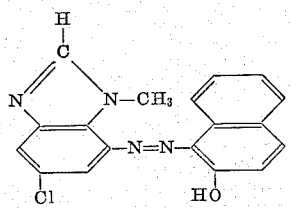

is filtered off, washed with water and filtered off with suction so as to be as dry as possible. The moist press cake is stirred into 500 cc. of chlorobenzene and dehydrated by azeotropic distillation. There is obtained a clear yellow red solution into which are introduced, at 90°–100° C. 10 cc. of dimethyl sulfate. After the quaternization, the dark brown precipitate which has precipitated during the quaternization is filtered off with suction while still hot, washed with a small amount of benzene and dried at 60° C. There are obtained 45 g. of dyestuff salt of the formula

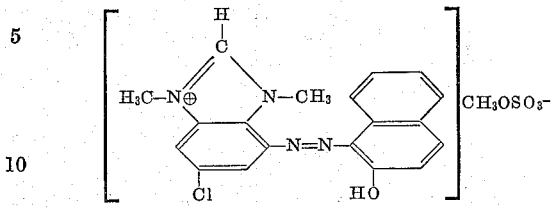

which dissolves in warm water to give an orange red solution and dyes polyacrylonitrile fibers from an acetic bath full orange shades having good properties of fastness.

*Example 5*

When proceeding as described in Example 4, but using 12 cc. of diethyl sulfate instead of 10 cc. of dimethyl sulafte for the quaternization, there are obtained 48 g. of the dyestuff salt of the formula

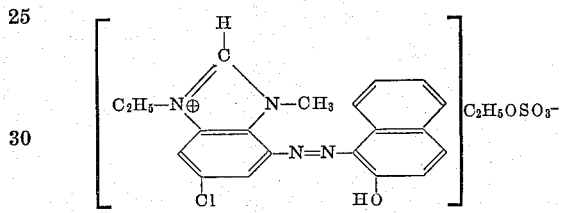

which dissolves in warm water to give an orange red solution and which dyes polyacrylonitrile fibers from an acetic bath fast orange shades.

*Example 6*

32.2 g. of 5-chloro-7-amino-3-methyl-1-ethylbenzimidazoliummethyl sulfate are diazotized at 0° to 5° C. in 300 cc. of water and 70 cc. of 5N-hydrochloric acid with 21 cc. of 5N-sodium nitrite solution and the nitrite excess is destroyed by the addition of a small amount of amidosulfonic acid. The clarified diazo solution is then introduced at 10° C. into a well stirred solution of 14.5 g. of 1-aminonaphthalene in 500 cc. of water and 30 cc. of 5N-hydrochloric acid. When coupling is completed, the precipitated dyestuff the cation of which has the formula

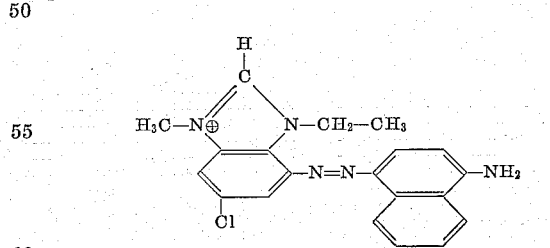

is filtered off with suction, washed with a small amount of water and dried at 60° C. There are obtained about 40 g. of dyestuff salt which dissolves in hot water to give a red brown solution and which dyes polyacrylonitrile fibers fast deep claret shades.

*Example 7*

30.8 g. of 5-chloro-7-amino-1,3-dimethylbenzimidazoliummethyl sulfate are diazotized at 0° to 5° C. in 200 cc. of water and 70 cc. of 5N-hydrochloric acid with 21 cc. of 5N-sodium nitrite solution. After having neutralized the small excess of nitrite by adding a small amount of amidosulfonic acid, the diazo solution is run into a solution of 11 g. of 1,3-diaminobenzene in 100 cc. of water.

When coupling is completed, the zinc chloride complex salt of the dyestuff cation of the formula

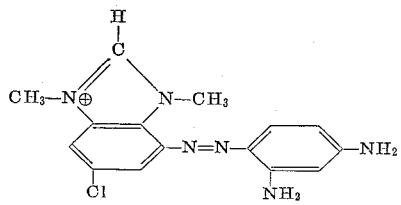

precipitated by the addition of an aqueous zinc chloride solution, filtered off with suction, washed with a small amount of ice-water and dried at 60° C. There are obtained about 40 g. of a dark powder which dissolves in water to give a brown solution and which dyes polyacrylonitrile fibers deep red brown shades that have good properties of fastness.

*Example 8*

17.5 g. of 1-ethyl-5-methyl-7-aminobenzimidazole are diazotized in the usual manner at 0° to 5° in 400 cc. of water and 50 cc. of 5N-hydrochloric acid with a 5N-sodium nitrite solution (20.5 cc.) and the small excess of nitrite is destroyed by the addition of a small amount of amidosulfonic acid. 16 g. of 3-methyl-N,N-diethylaniline are then introduced dropwise, while stirring, into the clear diazo solution. Coupling is completed by slow dropwise addition of 50 cc. of a binormal sodium acetate solution. The pH of the coupling mixture is then adjusted to a value of 10 by means of dilute sodium hydroxide solution and after 15 minutes, the dyestuff is filtered off with suction. The dyestuff washed with water to neutrality is well pressed to remove water and dissolved in 400 cc. of chlorobenzene and the water is then removed by azeotropic distillation. 10 cc. of dimethyl sulfate are then added dropwise at about 100° C. and, when the quaternization is completed, the methyl sulfate of the dyestuff cation of the formula

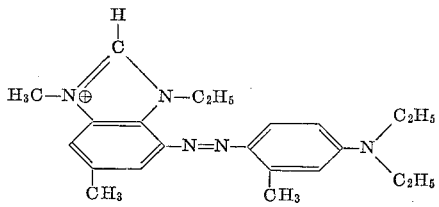

which has precipitated in crystalline form is filtered off with suction. The dyestuff salt dissolves readily in water to give a red solution and dyes polyacrylonitrile fibres from an acetic bath a covered reddish brown shade having good properties of fastness. Wool is resisted to a large extent.

*Example 9*

28.7 g. of 1,3,5-trimethyl - 7 - aminobenzimidazolium-methyl sulfate are diazotized in the usual manner at 0° to 5° C. in 300 cc. of water and 77 cc. of 5N-hydrochloric acid with 20.5 cc. of 5N-sodium nitrite solution. A small excess of nitrite is destroyed by the addition of a small amount of amidosulfonic acid. 18.4 g. of 3-chloro-N,N-diethylaniline are then introduced slowly and dropwise into the diazonium mixture. After completion of coupling there has formed a dark brown red solution of the dyestuff. The zinc chloride complex salt of the dyestuff cation of the formula

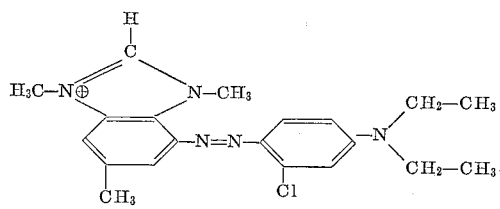

is precipitated from the solution by adding an aqueous zinc chloride solution, washed with a small amount of cold water and dried at 60° C. The dyestuff salt dissolves readily in water to give a brown red solution and dyes polyacrylonitrile fibers from an acetic bath fast brownish orange shades.

The following table lists further azo dyestuffs of the Formula I which can be obtained according to the present invention and the shades of dyeings on polyacrylonitrile fibers:

| R | $R_1$ | $R_2$ | $R_3$ | A–Z | Shade |
|---|---|---|---|---|---|
| Chlorine | Methyl | Hydrogen | Methyl | 3-methyl-N,N-dimethylaniline | Yellowish red. |
| Do | do | do | do | N,N-dimethylaniline | Scarlet. |
| Do | do | do | do | N,N-diethylaniline | Bluish red. |
| Do | do | do | do | 3-methyl-N,N-di-β-hydroxyethylaniline | Do. |
| Do | do | do | do | N,N-di-β-hydroxy-ethylaniline | Scarlet. |
| Do | do | do | do | 3-chloro-N,N-di-β-hydroxyethylaniline | Do. |
| Do | do | do | Ethyl | 3-methyl-N,N-dimethylaniline | Do. |
| Do | do | do | do | 3-methyl-N,N-diethylaniline | Bluish red. |
| Do | do | do | do | 3-chloro-N,N-diethylaniline | Scarlet. |
| Do | do | do | do | N,N-dimethylaniline | Rust red. |
| Do | do | do | do | N,N-diethylaniline | Bluish red. |
| Do | do | do | do | 3-methyl-N,N-di-β-hydroxyethylaniline | Red. |
| Do | do | do | do | N,N-di-β-hydroxyethylaniline | Rust red. |
| Do | do | do | do | 3-chloro-N,N-di-β-hydroxyethylaniline | Do. |
| Do | do | do | do | N-methyl-N,N-β-hydroxyethylaniline | Do. |
| Do | Ethyl | do | Methyl | 3-methyl-N,N-diethylaniline | Bluish red. |
| Do | do | do | do | 3-methyl-N,N-dimethylaniline | Yellowish red. |
| Do | do | do | do | 3-chloro-N,N-diethylaniline | Red. |
| Do | do | do | do | N,N-dimethylaniline | Scarlet. |
| Do | do | do | do | N,N-diethylaniline | Bluish red. |
| Do | do | do | do | N-methyl-N-β-hydroxy-ethylaniline | Yellowish red. |
| Do | do | do | do | 3-methyl-N,N-di-β-hydroxyethylaniline | Red. |
| Do | do | do | do | N,N-di-β-hydroxyethylaniline | Scarlet. |
| Do | do | do | do | 3-chloro-N,N-diethylaniline | Do. |
| Do | do | do | Ethyl | 3-methyl-N,N-diethylaniline | Bluish red. |
| Do | do | do | do | 3-methyl-N-N-dimethylaniline | Red. |
| Do | do | do | do | 3-chloro-N,N-diethylaniline | Do. |
| Do | do | do | do | N,N-dimethylaniline | Rust red. |
| Do | do | do | do | N,N-diethylaniline | Bluish red. |
| Do | do | do | do | N-methyl-N,N-β-hydroxyethylaniline | Rust red. |
| Do | do | do | do | 3-methyl-N,N-di-β-hydroxyethylaniline | Bluish red. |
| Do | do | do | do | N,N-di-β-hydroxyethylaniline | Rust red. |
| Do | do | do | do | 3-chloro-N,N-di-β-hydroxyethylaniline | Scarlet. |

| R | R₁ | R₂ | R₃ | A–Z | Shade |
|---|---|---|---|---|---|
| Chloride | Methyl | Methyl | Methyl | N,N-dimethylaniline | Red. |
| Do | do | do | Ethyl | do | Do. |
| Do | do | Hydrogen | Methyl | 1-dimethylaminonaphthalene | Violet. |
| Do | n-Propyl | do | do | 3-methyl-N,N-diethylaniline | Bluish red. |
| Do | do | do | Ethyl | do | Do. |
| Do | n-Butyl | do | do | do | Do. |
| Do | do | do | Methyl | do | Do. |
| Do | do | do | do | 3-methyl-N,N-di-β-hydroxyethylaniline | Do. |
| Do | do | do | do | 3-chloro-N,N-di-β-hydroxyethylaniline | Scarlet. |
| Do | do | do | do | 3-chloro-N,N-diethylaniline | Yellowish red. |
| Do | do | do | do | 3-chloro-N,N-dimethylaniline | Bluish red. |
| Do | do | do | Ethyl | N,N-diethylaniline | Do. |
| Do | do | do | do | N,N-dimethylaniline | Rust red. |
| Do | do | do | do | 3-chloro-N,N-diethylaniline | Claret. |
| Do | do | do | do | 3-chloro-N,N-dimethylaniline | Bluish red. |
| Do | Methyl | do | Methyl | 1,3-dihydroxybenzene | Reddish yellow. |
| Do | do | do | do | 3-chloro-N-ethylaniline | Orange. |
| Do | do | do | do | 2,5-dimethoxyaniline | Yellowish red. |
| Do | do | do | do | Aniline | Reddish yellow. |
| Do | do | do | do | N-methylaniline | Orange. |
| Do | do | do | do | 2-methyl-N-methylaniline | Reddish orange. |
| Do | do | do | do | N-ethylaniline | Orange brown. |
| Do | do | do | do | 3-methyl-1-hydroxybenzene | Reddish yellow. |
| Do | do | do | do | 4-methyl-1-hydroxybenzene | Do. |
| Do | do | do | do | 3-methoxyaniline | Brownish orange. |
| Do | do | do | do | 3-methylaniline | Orange. |
| Do | do | do | do | 1-aminonaphthalene | Claret. |
| Do | do | do | do | 2,4-dihydroxyquinoline | Reddish Yellow. |
| Do | n-Buyl | do | do | 1-aminonaphthalene | Wine red. |
| Do | do | do | Ethyl | do | Do. |
| Do | do | do | do | 3-chloraniline | Reddish light brown. |
| Do | Ethyl | do | do | 2-aminonaphthalene | Yellowish red. |
| Do | do | Methyl | do | 1-aminonaphthalene | Wine red. |
| Do | do | do | Methyl | 2-aminonaphthalene | Yellowish red. |
| Do | do | do | do | 1-aminonaphthalene | Wine red. |
| Do | Methyl | Hydrogen | Ethyl | Phenol | Reddish yellow. |
| Do | do | do | do | 2-aminonaphthalene | Scarlet. |
| Do | do | do | do | 1-aminonaphthalene | Claret. |
| Do | do | do | do | 1-phenyl-3-methyl-5-pyrazolone | Reddish yellow. |
| Do | do | do | do | 1,3-dihydroxybenzene | Do. |
| Do | do | do | Methyl | Phenol | Do. |
| Do | Ethyl | do | do | 3-hydroxydiphenylamine | Yellowish red. |
| Do | do | do | do | 2-hydroxynaphthalene | Orange. |
| Do | do | do | do | 1-hydroxynaphthalene | Orange brown. |
| Do | do | do | do | 2-aminonaphthalene | Yellowish red. |
| Methyl | Butyl | do | do | 3-chloro-N,N-diethylaniline | Brownish orange. |
| Do | Methyl | Methyl | do | do | Do. |
| Do | Ethyl | Hydrogen | Ethyl | 3-methyl-N,N-dimethylaniline | Orange brown. |
| Do | do | do | do | N,N-dimethylaniline | Yellow brown. |
| Do | do | do | do | N,N-diethylaniline | Rust brown. |
| Do | do | do | do | 3-methyl-N,N-di-β-hydroxyethylaniline | Do. |
| Do | do | do | do | 3-chloro-N,N-di-β-hydroxyethylaniline | Yellow brown. |
| Do | do | do | do | N,N-di-β-hydroxyethylaniline | Do. |
| Do | do | do | do | N-methyl-N-β-hydroxyethylaniline | Do. |
| Do | Methyl | do | Methyl | 3-chloro-N-N-di-β-hydroxyethylaniline | Do. |
| Do | do | do | do | N,N-di-β-hydroxyethylaniline | Do. |
| Do | do | do | do | 3-methyl-N,N-di-β-hydroxyethylaniline | Rust brown. |
| Do | do | do | do | N-methyl-N-β-hydroxyethylaniline | Yellow brown. |
| Do | do | do | do | N,N-diethylaniline | Rust brown. |
| Do | do | do | do | N,N-dimethylaniline | Yellow brown. |
| Do | do | do | do | 3-methyl-N,N-dimethylaniline | Orange brown. |

We claim:

1. A basic azo-dyestuff free from sulfonic acid and carboxylic acid groups having the general formula

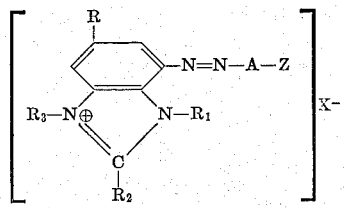

wherein R represents a chlorine atom or a methyl group, R₁ and R₃ each represent a lower alkyl group, R₂ represents a hydrogen atom or a lower alkyl group, A represents a benzene radical, a benzene radical substituted by chlorine, a lower alkyl, lower alkoxy, amino or hydroxy, a naphthalene radical, a quinoline radical or a pyrazole radical, Z stands for a hydroxy, amino, lower alkylamino, lower fluoralkylamino, lower hydroxyalkylamino, lower cyanalkylamino, lower alkoxy-lower alkylamino, phenoxy-lower alkylamino, phenylamino, di-(lower alkyl)-amino, di-(lower hydroxyalkyl)-amino, di-(lower fluoralkyl)-amino, di-(lower cyanoalkyl)-amino, di-(lower alkoxy-lower alkyl)-amino, di-(phenoxy-lower alkyl)-amino, di-(phenyl-lower alkyl)-amino, lower alkyl-lower fluoralkyl-amino, lower alkyl-lower hydroxyalkyl-amino, lower alkyl-lower cyanoalkyl-amino, lower alkyl-lower alkoxyalkylamino, lower alkyl phenoxy-lower alkylamino, lower alkyl-phenyl, lower alkylamino, lower alkyl phenyl-amino, piperidino, morpholino or piperazino group and X⁻ stands for an anion of hydrochloric, hydrobromic or hydroiodic acid, sulfuric acid, a lower monoalkyl-ester of sulfuric acid, benzene sulfonic acid, p-toluene sulfonic acid, or a zinc chloride or cadmium chloride complex compound.

2. A basic azo-dyestuff free from sulfonic acid and carboxylic acid groups having the general formula

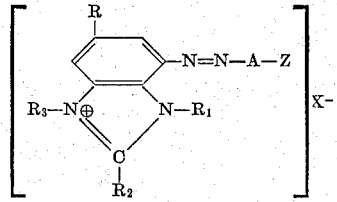

wherein R represents a chlorine atom or a methyl group, R₁ and R₃ each represent a lower alkyl group, R₂ represents a hydrogen atom or a lower alkyl group, A represents a benzene radical, a benzene radical substituted by a chlorine atom, a methyl, methoxy, amino or hydroxy group, a naphthalene radical, a quinoline radical or a pyrazole radical, Z stands for a hydroxy, amino, lower alkylamino, phenylamino, di-(lower alkyl)-amino, di-lower hydroxyalkyl)-amino or a lower alkyl-lower hydroxyalkylamino group, X⁻ stands for the anion of hydrochloric acid, a lower monoalkylester of sulfuric acid, or a zinc chloride complex compound.

3. The basic azo-dyestuff having the formula

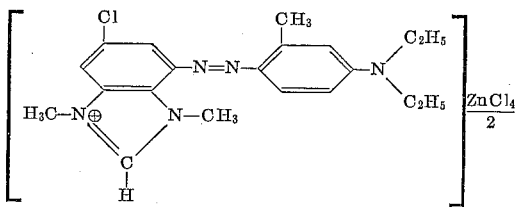

4. The basic azo-dyestuff having the formula

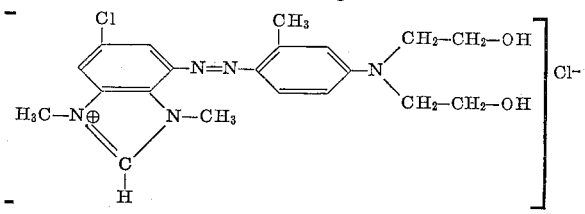

5. The basic azo-dyestuff having the formula

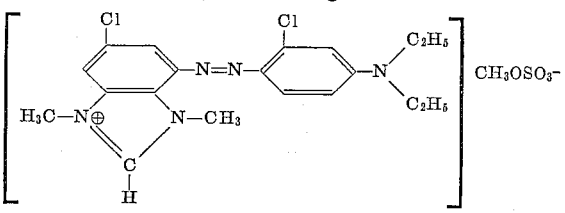

6. The basic azo-dyestuff having the formula

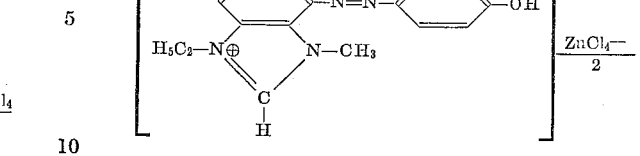

7. The basic azo-dyestuff having the formula

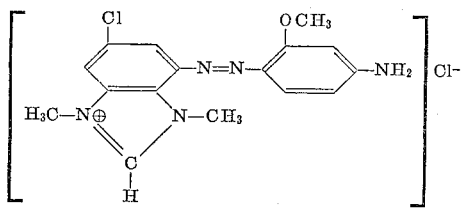

References Cited

UNITED STATES PATENTS 2,883,373  4/1959  Bosshard et al. _____ 260—146
3,121,710  2/1964  Sureau et al. _____ 260—157 X

FOREIGN PATENTS 628,278  8/1963  Belgium.

CHARLES B. PARKER, *Primary Examiner.*
FLOYD D. HIGEL, *Assistant Examiner.*